United States Patent Office 3,275,714
Patented Sept. 27, 1966

3,275,714
METHOD AND CATALYSTS FOR CONVERTING VINYL CHLORIDE POLYMER-MONOMER COMPOSITIONS TO POLYMERIC PRODUCTS
Clifford F. Thompson, Midland, Mich., assignor to The Dow Chemical Company, Midland, Mich., a corporation of Delaware
No Drawing. Filed Apr. 1, 1963, Ser. No. 269,741
16 Claims. (Cl. 260—884)

This invention relates to improvements in the making of vinyl chloride polymer compositions. It pertains especially to catalyst materials for polymerizing compositions of vinyl chloride polymers and ethylenically unsaturated monomers comprised of a predominant amount of alkenyl aromatic compounds to produce polymeric products.

The modification of polyvinyl chloride to improve its processability by the addition of a low molecular weight, plasticizing substance is known. It is also known that if the plasticizing substance is an ethylenically unsaturated monomer, this monomer may be polymerized after the processing step, so that the final product is no longer plasticized to the degree it initially was. Thus, polyvinyl chloride may be dispersed in vinyl monomers to form an easily processable fluid, which may later be converted to a rigid or semi-rigid state by polymerization of the monomers. Similarly, the molding temperature of a non-fluid composition of polyvinyl chloride may be reduced by the incorporation of vinyl monomers which initially plasticize the polyvinyl chloride, but which are polymerized during the molding cycle to reduce the degree of plasticization and yield a rigid or semi-rigid product. Thus, it is possible to reduce the well-known susceptibility of polyvinyl chloride to thermal degradation.

In such applications, it is often desirable that the material be readily and rapidly converted to a rigid or semi-rigid condition and that the polymeric product be possessed of good mechanical properties such as high flexural and tensile strength, good impact strength, and high heating distortion temperature, together with good transparency.

It is a primary object of the invention to provide a method and catalyst for readily and rapidly converting vinyl chloride polymer compositions, comprised of vinyl chloride polymer particles admixed with ethylenically unsaturated monomers, into polymeric products. Another object is to provide synergist catalyst materials for polymerizing compositions of vinyl chloride polymers and ethylenically unsaturated monomers. A specific object is to provide a method and catalyst materials for polymerizing compositions of vinyl chloride polymers and ethylenically unsaturated monomers comprised of a predominant amount of one or more alkenyl aromatic compounds. Other and related objects may appear from the following description of the invention.

According to the invention the foregoing and related objects are obtained by heating at elevated temperatures, e.g. at temperatures sufficiently high that the monomers completely solvate or substantially solvate the vinyl chloride polymer such as temperatures of from about 120 to 180° C., a composition comprised of a finely divided vinyl chloride polymer and ethylenically unsaturated monomers, at least a predominant amount of the polymerizable ethylenically unsaturated monomers being preferably one or more monoalkenyl aromatic compounds, in intimate admixture with a small amount, suitably within the range of from about one to ten percent by weight of the polymerizable monomer, of a stannous salt as hereinafter defined, and a small, usually smaller, amount, preferably within the range of from about one-tenth to about two percent by weight of the polymerizable monomer, of an organic peroxide selected from the group consisting of (a) organic peroxides having the general formula

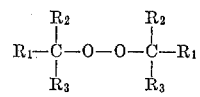

wherein $R_1$, $R_2$ and $R_3$ are independently selected from the group consisting of hydrogen, alkyl and aryl radicals, (b) organic peroxides having the general formula

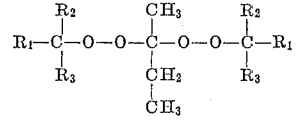

wherein $R_1$, $R_2$ and $R_3$ have ahe meaning given above, and (c) organic peroxides having the general formula

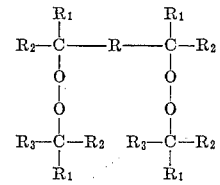

wherein R is a divalent hydrocarbon radical of the formula
—$CH_2$—$CH_2$—, —$CH=CH$—, —$C\equiv C$— and

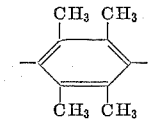

and $R_1$, $R_2$ and $R_3$ have the meaning given above.

Examples of suitable peroxides embraced by the above formulae are:

cumyl ethyl peroxide,
di-tert.-butyl peroxide,
di-tert.-amyl peroxide,
cumyl tert.-butyl peroxide,
cumyl tert.-octyl peroxide,
cumyl isopropyl peroxide,
cumyl butyl peroxide,
dicumyl peroxide,
bis(alpha-methylbenzyl)peroxide,
bis(alpha-ethylbenzyl)peroxide,
bis(alpha-propylbenzyl)peroxide,
bis(alpha-isopropylbenzyl)peroxide,
bis(alpha,alpha-dimethylbenzyl)peroxide,
bis(alpha-methyl-alpha-ethylbenzyl)peroxide,
bis(alpha,alpha-diethylbenzyl)peroxide,
bis(alpha,alpha-di-propylbenzyl)peroxide,
bis(alpha,alpha-diisopropylbenzyl)peroxide,
bis(alpha,alpha-p-methylbenzyl)peroxide,
bis(alpha-methyl-alpha-ethyl-p-methylbenzyl)peroxide,
bis(alpha,alpha-diethyl-p-methylbenzyl)peroxide,
bis(alpha,alpha-diisopropyl-p-methylbenzyl)peroxide,
bis(alpha,alpha-dimethyl-p-ethylbenzyl)peroxide,
bis(alpha-methyl-alpha-ethyl-p-ethylbenzyl)peroxide,
bis(alpha-diethyl-p-ethylbenzyl)peroxide,
bis(alpha-alpha-diisopropyl-p-ethylbenzyl)peroxide,
bis(alpha,alpha-dimethyl-p-isopropylbenzyl)peroxide,
bis(alpha-methyl-alpha-ethyl-p-isopropylbenzyl)peroxide,
bis(alpha,alpha-diethyl-p-isopropylbenzyl)peroxide,
bis(alpha,alpha-diisopropyl-p-isopropylbenzyl)peroxide,
bis(alpha,alpha-dimethyl-p-tert.-butylbenzyl)peroxide,
bis(alpha-methyl-alpha-ethyl-p-tert.-butylbenzyl)-peroxide,
bis(alpha,alpha-diethyl-p-tert.-butylbenzyl)peroxide,
bis(alpha,alpha-diisopropyl-p-tert.-butylbenzyl)peroxide,
bis(alpha,alpha-dimethyl-p-pentamethylethylbenzyl)-peroxide, bis(alpha-methyl-alpha-ethyl-p-pentamethyl-ethyl-benzyl)peroxide.
bis(alpha,alpha-diethyl-p-pentamethylethylbenzyl)-peroxide,
bis(alpha-alpha-diethyl-p-pentamethylbenzyl)peroxide,
bis(alpha,alpha-diisopropyl-p-pentamethylethylbenzyl)-peroxide,
bis(triphenylbenzyl)peroxide,
1,4-bis-(tert.-butyl peroxy methyl)durene,
2,5-dimethyl-2,5-di-tert.-butylperoxy hexane,
2,5-dimethyl-2,5-di-tert.-butyl peroxy hexyne,
2,2-bis(tert.-butyl peroxy)butane, and
bis(p-methyl)cumyl peroxide.

The vinyl chloride polymers to be employed can be polyvinyl chloride or copolymers of vinyl chloride with small amounts, e.g. 15 percent by weight or less, of other polymerizable materials such as vinyl acetate, vinyl propionate, methyl acrylate, butyl acrylate, methyl methacrylate, lauryl methacrylate, vinylidene chloride and the like. When fluid compositions are preferred, it is desirable that the polyvinyl chloride or vinyl chloride polymers be of high molecular weight and in finely divided form, preferably of plastisol grade, e.g. consisting of solid dense particles of average diameters in the range of from about 0.5 to about 2 microns. Blends of the plastisol grade polyvinyl chloride and suspension polymerized vinyl chloride polymers can also be used, as well as suspension polymerized vinyl chloride polymers. The term "vinyl chloride polymer" employed herein includes homopolymers of vinyl chloride and copolymers of at least 85 percent by weight of vinyl chloride with not more than 15 percent by weight of one or more other ethylenically unsaturated organic compounds copolymerizable therewith.

The vinyl chloride polymer or polyvinyl chloride can be used in amounts corresponding to from 30 to 70 percent by weight of the sum of the weights of the polymer and the monomer initially used, and correspondingly the monomer(s), i.e., the weight of the monomer, or the sum of the weights of the monomers such as a mixture of a predominant amount of a monovinyl aromatic hydrocarbon and a minor amount of unsaturated ester, are employed in amounts of from 70 to 30 percent by weight of the sum of the weights of the polymer and the monomer in the composition.

The monovinyl aromatic compound can be a hydrocarbon such as styrene, ortho, meta- or para-vinyltoluene or a mixture of two or more of such isomers, vinylxylene, or ethylvinylbenzene, or a nuclear halogenated monovinyl aromatic hydrocarbon such as chlorostyrene, dichlorostyrene, bromostyrene, fluorostyrene, ar-chloro-vinyltoluene or ar-chlorovinylxylene containing from 8 to 10 carbon atoms in the molecule, or mixtures of any two or more vinyl aromatic compounds, e.g. a mixture of t-butyl styrene with vinyl toluene. The monovinyl aromatic monomer is employed in amounts corresponding to at least a predominant amount by weight of the total monomers and have the general formula

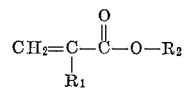

wherein X and Y are independently selected from the group consisting of hydrogen, halogen and alkyl radicals containing from 1 to 4 carbon atoms.

Mixtures of the aromatic compounds with a minor proportion of unsaturated esters such as (a) an ester of fumaric acid having the general formula:

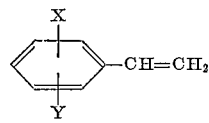

wherein R and R' each represents an alkyl radical containing from 2 to 8 carbon atoms, or (b) an ester of acrylic or methacrylic acid having the general formula

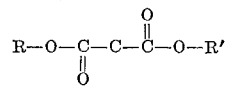

wherein $R_1$ represents hydrogen or the methyl radical and $R_2$ is a member of the group consisting of the cyclohexyl radical and alkyl radicals containing from 4 to 12 carbon atoms, can also be used.

Examples of esters embraced by the above formulae are diethyl fumarate, dibutyl fumarate, dihexyl fumarate, di-(2-ethylhexyl)fumarate, butyl acrylate, hexyl acrylate, 2-ethylhexyl acrylate, lauryl acrylate, butyl methacrylate, hexyl methacrylate, 2-ethylhexyl methacrylate, lauryl methacrylate, cyclohexyl acrylate and cyclohexyl methacrylate.

The esters of fumaric acid, acrylic acid and/or methacrylic acid can be used in amounts corresponding to from about 5 to about 50 percent by weight of the sum of the weights of the ester and the monovinyl aromatic hydrocarbon employed. It may be mentioned that where it is desirable to prepare a polymer having a high modulus, best results are usually obtained when the minimum proportion of the unsaturated ester employed is within the range of from 5 to about 10 percent of the monomer portion. When it is desired to obtain a product having a maximum transparency, flexibility, and impact resistance, best results are usually obtained when the unsaturated ester content is between 10 and about 50 percent of the monomer.

It is known that alkenyl aromatic monomers can be admixed with polyvinyl chloride and converted to rigid polymeric products by initiating polymerization with organic peroxides. The polymeric products are usually brittle and opaque, owing to the presence of large amounts of the homopolymer of the alkenyl aromatic monomers. When stannous salts are used in combination with the peroxide, the polymeric products are much stronger and more transparent, and have more of the polymerized monomer grafted to the polyvinyl chloride. It is pointed out that this improvement in transparency is a change from the milky opaque appearance usually associated with blends of incompatible polymers to a clear appearance associated with compatibility. It is not to be confused with an improvement in color associated with improved thermal stabilization of polyvinyl chloride.

When mixtures of vinyl chloride polymers and alkenyl aromatic monomers and/or unsaturated ester monomers are polymerized in the presence of polyvinyl chloride using a synergistic stannous salt-peroxide catalyst system, increases in transparency, flexural strength, and impact strength are observed. It is of particular importance that increases in the strength at low temperatures can be obtained in this manner.

In forming compositions the polyvinyl chloride in finely divided form is blended or mixed with the monovinyl aromatic compound and/or the unsaturated ester or a mixture of the monomers, in any usual way, together with pigments, stabilizers, dyes, antioxidants, or inhibitors, if desired. It may be mentioned that best results are usually obtained when a small amount of a usual thermal stabilizing agent for polyvinyl chloride, such as dibutyl tin dilaurate, and barium-cadmium soaps and the like are incorporated with the vinyl chloride polymer. The fluid compositions can be poured into a mold cavity, or spread as a layer on a flat plate or belt, or used to coat or impregnate a mat or sheet of fibrous material such as cloth, wood fibers, cotton linters, glass fibers, glass cloth, paper and the like to fill crevices in molds or to flow out evenly in coating cloth, metal, or glass fibers, to impregnate the materials. When prepared as non-fluid compositions, the mixtures can be molded by pressure.

In the curing of the compositions by polymerization of the monmers, in accordance with the invention there is intimately incorporated with the vinyl chloride polymer and the monomers, a small amount, e.g. from 1 to 10 percent by weight of the monomers, of a stannous salt selected from the group consisting of stannous naphthenate and stannous slats of aliphatic monocarboxylic acids containing from 6 to 18 carbon atoms in the molecule, together with from 0.1 to 2 percent by weight, of a organic peroxide as hereinbefore mentioned, based on the weight of the monomers. In order to inhibit premature polymerization of the monmers, e.g. during blending of the polymer and monomer or in solvating the polymer with the monomer, a polymerization inhibitor such as hydroquinone may be added.

The stannous salt and the organic peroxide in combination, not only have an action of accelerating the polymerization of the ethylenically unsaturated monmers to convert the compositions to polymeric products, but said materials have a synergistic action for affecting interpolymerization of the monomer with the vinyl chloride polymer to form graft copolymer products which are possessed of good transparency, as well as good mechanical properties, and have more of the polymerized monomer chemically combined or graft copolymerized with the vinyl chloride polymer. The improvement in transparency is observed as a change from the milky opaque appearance usually associated with blends of incompatible polymers, to a clear transparent appearance associated with blends of compatible colorless polymers, and is not to be confused with an improvement in color such as is associated with improved thermal stabilization of vinyl chloride polymers.

The fluid compositions can be employed to impregnate or coat fibrous materials such as a set of chopped strand glass fibers or glass cloth, which are then cured by heating to polymerize the monomers to produce polymeric products having the reinforcing fibrous materials embedded therein. They are also used to produce transparent plastic sheet and film having as combination of high strength, flexibility, and high heat distortion temperatures not attainable by other means.

The curing of the composition can be accomplished by heating the same in an oven or between platens of a press or in a mold at elevated temperatures sufficient to solvate or substantially solvate the vinyl chloride polymer with the liquid monomer, suitably at temperatures between about 120° and 180° C., preferably 130 and 170° C. and usually for a period of time of from about 5 to 60 minutes, depending in part upon the thickness of the section to be cured and in part upon the peroxide employed as curing agent, although longer times may be used. Heating for prolonged periods of time at temperatures which result in deterioration or discoloring of the polymeric product are to be avoided.

The following examples illustrative ways in which the principle of the invention has been applied but are not to be construed as limting its scope.

EXAMPLE 1

In each of a series of experiments, a charge of 50 grams of a finely divided plastisol grade of polyvinyl chloride was mixed with 50 grams of a mixture of isomeric vinyltoluenes consisting of about 67 percent by weight of meta-vinyltoluene and 33 percent para-vinyltoluene, together with 1 gram of dibutyl tin dilaurate as stabilizer, 0.5 gram of dicumyl peroxide as catalyst and stannous octoate as synergist catalyst in amount as stated in the following table. The mixture of ingredients was stirred under vacuum for 2 minutes to thoroughly mix the same and to remove air from the mixture. A portion of the mixture was poured into a 4" x 4" mold to form a layer ⅛-inch deep. The layer was heated and pressed between platens at a temperature of 160° C., for a period of 10 minutes, or at 140° C., for 30 minutes, as stated in the table to form a cured sheet, then was cooled and the sheet removed from the mold. Test pieces of ½ x ⅛ inch cross section were cut from the molded product. These test pieces were used to determine flexural strength for the product employing procedure similar to that described in ASTM D790–49T. Unnotched impact strength was determined by procedure similar to that described in ASTM D–256–57T, except that the test pieces were struck from the flat side and the result reported in inch-pounds. Other test pieces were used to determine a light transmission value for the product employing a recording spectrophotometer (General Electric Company) and light of wave lengths between 400 and 700 millimicrons.

The percent of light transmission is a measure of the transparency of the test piece, and it increases as the content of the graft copolymer in the product increases. The greater the percent transmission of light, the less opaque (or less hazy) is the test piece, and the greater is the proportion of graft copolymer in the product. Other portions of the molded product were tested to determine the approximate amount of homopolymerized vinyltoluene therein. The procedure for determining the approximate percent of homopolymerized vinyltoluene in the product was to place a weighed sample of the molded product in a soxhlet extraction apparatus and extract the product with hot toluene for a given period of time. The extracted product is then recovered, is dried and reweighed. The loss in weight or amount of extracted polymer is taken as a measure of the amount of homopolymerized vinyltoluene in the product. The amount or residue is taken as a measure of the amount of graft copolymer. Table I identifies the experiments and gives the proportion of ingredients employed in making the compositions. The table also gives the properties determined for the product and the proportion of residue and of extracted polymer in the product. It should be noted that the increase in toluene insoluble product is due to grafting and not cross-linking, since these materials are completely soluble in a solvent such as tetrahydrofuran.

*Table I*

| Run No. | Starting Materials | | | Polymerizing Conditions | | Product | | | | |
|---|---|---|---|---|---|---|---|---|---|---|
| | Polyvinyl Chloride, gms. | Vinyl-toluene, gms. | Stannous Octoate, gms. | Temp., ° C. | Time, Min. | Flexural Strength, lbs./sq. in. | Impact[a] Strength, in.-lbs. | Light Transmission, Percent | Residue, Percent | Extract, Percent |
| 1 | 50 | 50 | 0 | 160 | 10 | 6,000 | 0.6 | 28.9 | 42.6 | 57.4 |
| 2 | 50 | 50 | 2 | 160 | 10 | 13,400 | 1.5 | 85.5 | 58.6 | 41.4 |
| 3 | 50 | 50 | 4 | 160 | 10 | 13,600 | 2.3 | 88.1 | 60.2 | 39.8 |
| 4 | 50 | 50 | 6 | 160 | 10 | 12,800 | 1.8 | 89.3 | 78.6 | 21.4 |
| 5 | 50 | 50 | 0 | 140 | 30 | 7,200 | 0.8 | 27.0 | 49.8 | 50.2 |
| 6 | 50 | 50 | 2 | 140 | 30 | 15,200 | 2.7 | 58.9 | 65.7 | 34.3 |
| 7 | 50 | 50 | 4 | 140 | 30 | 15,100 | 2.9 | 77.3 | 69.1 | 30.9 |
| 8 | 50 | 50 | 6 | 140 | 30 | 14,000 | 2.6 | 74.8 | 68.2 | 31.8 |

[a] Test bars of ⅛ x ½ inch cross section broken flatwise.

EXAMPLES 2

In each of a series of experiments, a charge of 40 grams of a vinyltoluene fraction consisting of 94 percent by weight of ortho-vinyltoluene, about 4 percent meta-vinyltoluene and 2 percent para-vinyltoluene, 1 gram of bibutyl tin dilaurate, 0.4 gram of dicumyl peroxide, and stannous octoate in amount as stated in the following table, was mixed with 60 grams of finely divided polyvinyl chloride polymer of plastisol grade at room temperature. A portion of the mixture was placed into a 4" x 4" mold to form a layer ⅛ inch deep. The layer was pressed between platens and was heated at a temperature of 150° C. for a period of 20 minutes, to polymerize the vinyltoluene monomers, or cure the product, then was cooled and the product was removed from the mold. Test pieces of ½ x ⅛ inch cross section were cut from the molded product. These test pieces were used to determine flexural strength and flexural modulus for the product employing procedures similar to those described in ASTM D790–49T. Impact strength was determined by striking an unnotched bar on the flat side employing procedure similar to that described in ASTM D256–57T and reporting the value in inch-pounds. Other test pieces were used to determine a heat distortion temperature for the product by a procedure of Heirholzer and Boyer, ASTM Bulletin No. 134 of May 1945. Other test pieces were used to determine a light transmission value for the product employing a recording spectrophotometer (General Electric Company) and light of wave lengths between 400 and 700 millimicrons. The percent transmission of light is a measure of the transparency of the test piece. The greater the percent transmission of light, the less opaque is the piece. Table II identifies the experiments and gives the parts by weight of the ingredients polyvinyl chloride, vinyltoluene monomers and stannous octoate used in making the compositions. The table also gives the properties determined for the products, cured by heating in a mold at a temperature of 150° C. for a period of 20 minutes.

Table II

| Run No. | Starting Materials | | | Product | | | | |
|---|---|---|---|---|---|---|---|---|
| | PVC, gms. | VT, gms. | Stannous Octoate, gm. | Flexural Strength, lbs./sq. in. | Flexural Modulus $\times 10^{-5}$, lbs./sq. in. | Impact Strength, in.-lbs. | Heat Distortion Temperature, °C. | Light Transmission, Percent |
| 1 | 60 | 40 | None | 8,800 | 4.97 | 0.9 | 83 | 20.2 |
| 2 | 60 | 40 | 0.5 | 8,900 | 4.88 | 0.8 | 83 | 36.8 |
| 3 | 60 | 40 | 1.0 | 10,600 | 5.01 | 1.0 | 84 | 51.2 |
| 4 | 60 | 40 | 1.5 | 13,000 | 4.85 | 1.5 | 84 | 65.9 |
| 5 | 60 | 40 | 2.0 | 16,800 | 4.87 | 1.8 | 82 | 73.9 |
| 6 | 60 | 40 | 4.0 | 16,700 | 4.69 | 1.8 | 79 | 83.1 |
| 7 | 60 | 40 | 6.0 | 16,200 | 4.57 | 1.8 | 82 | 83.6 |
| 8 | 60 | 40 | 8.0 | 15,500 | 4.48 | 1.8 | 79 | 85.3 |

EXAMPLE 3

In each of a series of experiments, a composition was prepared by blending 50 parts by weight of finely divided polyvinyl chloride with 50 parts of a vinyltoluene fraction as employed in Example 2 and 0.4 gram of dicumyl peroxide, 1 gram of dibutyl tin dilaurate and stannous octoate in amount as stated in the following table. A portion of the composition was heated between platens at a temperature of 140° C. for a period of 30 minutes and cured to form a sheet ⅛ inch thick. Test pieces were cut from the cured sheet and were used to determine the properties for the cured product. Table IX identifies the experiments and gives the properties determined for the product.

Table III

| Run No. | Starting Materials | | | Product | | | |
|---|---|---|---|---|---|---|---|
| | PVC, pts. | VT, pts. | Stannous Octoate, pts. | Flexural Strength, lbs./sq. in. | Flexural Modulus $\times 10^{-5}$, lbs./sq. in. | Light Transmission, Percent | Heat Distortion Temperature, °C. |
| 1 | 50 | 50 | None | 7,200 | 4.58 | 32.2 | |
| 2 | 50 | 50 | 1.0 | 8,600 | 4.46 | 45.6 | |
| 3 | 50 | 50 | 1.5 | 10,900 | 4.31 | 56.0 | |
| 4 | 50 | 50 | 2.0 | 15,900 | 4.62 | 66.0 | |
| 5 | 50 | 50 | 4.0 | 16,200 | 4.56 | 76.8 | |
| 6 | 50 | 50 | 6.0 | 16,000 | 4.63 | 82.4 | 84 |
| 7 | 50 | 50 | 8.0 | 15,250 | 4.50 | 81.7 | 82 |

EXAMPLE 4

In each of a series of experiments, a finely divided plastisol grade of polyvinyl chloride was mixed with vinyltoluene, or styrene, and dicumyl peroxide and stannous octoate in proportions as stated in the following table. The compositions varied from pourable fluids to substantially dry blends, depending upon the amount of PVC present. The vinyltoluene employed was similar to that employed in Example 1. The material was prepared, was cured and the cured product tested employing procedures similar to those employed in Example 1. Table IV identifies the experiments and gives the properties determined for the product.

*Table IV*

| Run No. | Starting Materials | | | | | Polymerizing Conditions | | Product | | | | |
|---|---|---|---|---|---|---|---|---|---|---|---|---|
| | Polyvinyl Chloride, gm. | Vinyl toluene, gm. | Styrene, gm. | Stannous octoate, gm. | Dicumyl peroxide, gm. | Temp., °C. | Time, Min. | Flexural Strength, lbs./sq. in. | Flexural Modulus ×10⁻⁵, lbs./sq. in. | Impact [a] Strength, in.-lbs. | Barcol Hardness | Heat Distortion Temperature, °C. |
| 1 | 40 | 60 | | 4 | 0.6 | 150 | 20 | 15,100 | 3.97 | 1.5 | 66 | 73 |
| 2 | 50 | 50 | | 4 | 0.5 | 150 | 20 | 15,900 | 3.94 | 3.5 | 68 | 75 |
| 3 | 60 | 40 | | 4 | 0.4 | 150 | 20 | 16,600 | 4.13 | 3.2 | 67 | 74 |
| 4 | 70 | 30 | | 4 | 0.3 | 150 | 20 | 16,300 | 4.16 | 3.2 | 68 | 78 |
| 5 | 40 | | 60 | 4 | 0.6 | 150 | 20 | 16,200 | 4.28 | 2.0 | 65 | 77 |
| 6 | 50 | | 50 | 4 | 0.5 | 150 | 20 | 15,900 | 4.45 | 2.2 | 68 | 78 |
| 7 | 60 | | 40 | 4 | 0.4 | 150 | 20 | 17,200 | 4.72 | 3.7 | 67 | 78 |
| 8 | 70 | | 30 | 4 | 0.3 | 150 | 20 | 15,800 | 4.45 | 2.8 | 67 | 77 |

[a] Test bars of ⅛ x ½ inch cross section broken flatwise.

EXAMPLE 5

In each of a series of experiments, a finely divided plastisol grade of polyvinyl chloride was mixed with ortho-vinyltoluene or a mixture of ortho-vinyltoluene and meta- and para-vinyltoluene, and dibutyl tin dilaurate, dicumyl peroxide and stannous octoate in proportions as stated in the following table. The mixture was cured by heating the same between platens at a temperature of 150° C. for a period of 20 minutes. Table V identifies the experiments and gives the properties determined for the cured or polymeric product.

EXAMPLE 6

In each of a series of experiments, a finely divided plastisol grade of polyvinyl chloride was mixed with p-tert.-butylstyrene or a mixture of p-tert.-butylstyrene and a mixture of meta- and para-vinyltoluenes, and dicumyl peroxide and stannous octoate in proportions as stated in the following table. The mixture was cured or polymerized by heating the same between platens at a temperature of 150° C. for 20 minutes. Table VI identifies the experiments and gives the properties determined for the product.

*Table V*

| Run No. | Starting Materials | | | | | Polymerizing Conditions | | Product | | | |
|---|---|---|---|---|---|---|---|---|---|---|---|
| | Polyvinyl Chloride, gms. | Ortho-vinyl Toluene, gms. | m- and p- Vinyl Toluene, gms. | Dicumyl Peroxide, gm. | Stannous Octoate, gms. | Temp., °C. | Time, Min. | Flexural Strength, lbs./sq. in. | Flexural Modulus ×10⁻⁵, lbs./sq. in. | Impact [a] Strength, in.-lbs. | Heat Distortion Temp., °C. |
| 1 | 60 | 0 | 40 | 0.4 | 4 | 150 | 20 | 16,700 | 3.88 | 3.5 | 78 |
| 2 | 60 | 10 | 30 | 0.4 | 4 | 150 | 20 | 17,500 | 4.40 | 4.0 | 78 |
| 3 | 60 | 20 | 20 | 0.4 | 4 | 150 | 20 | 17,100 | 4.41 | 4.3 | 82 |
| 4 | 60 | 30 | 10 | 0.4 | 4 | 150 | 20 | 17,600 | 4.44 | 4.3 | 87 |
| 5 | 60 | 40 | 0 | 0.4 | 4 | 150 | 20 | 18,200 | 4.65 | 4.2 | 87 |

[a] Test bars of ⅛ x ½ inch cross section broken flatwise.

*Table VI*

| Run No. | Starting Materials | | | | | Polymerizing Conditions | | Product | | | |
|---|---|---|---|---|---|---|---|---|---|---|---|
| | Polyvinyl Chloride, gms. | m- and p- Vinyl Toluene, gms. | t-Butyl Styrene, gms. | Dicumyl Peroxide, gm. | Stannous Octoate, gms. | Temp., °C. | Time, Min. | Flexural Strength, lbs./sq. in. | Flexural Modulus ×10⁻⁵, lbs./sq. in. | Impact Strength, in.-lbs. | Heat Distortion Temperature, °C. |
| 1 | 60 | 0 | 40 | 0.4 | 4 | 150 | 20 | 7,600 | 3.96 | 1.3 | 91 |
| 2 | 60 | 13.3 | 26.7 | 0.4 | 4 | 150 | 20 | 13,800 | 4.08 | 2.4 | 83 |
| 3 | 60 | 20 | 20 | 0.4 | 4 | 150 | 20 | 16,500 | 4.08 | 2.8 | 86 |
| 4 | 60 | 26.7 | 13.3 | 0.4 | 4 | 150 | 20 | 16,600 | 4.14 | 3.5 | 79 |
| 5 | 60 | 33.3 | 6.7 | 0.4 | 4 | 150 | 20 | 16,900 | 4.21 | 3.8 | 78 |
| 6 | 60 | 40 | 0 | 0.4 | 4 | 150 | 20 | 16,600 | 4.18 | 2.9 | 76 |

EXAMPLE 7

In each of a series of experiments, a charge of 50 grams of a finely divided plastisol grade of polyvinyl chloride was mixed with 50 grams of a mixture of approximately 67 percent by weight of meta-vinyltoluene and 33 percent para-vinyltoluene and 4 grams of stannous octoate and 2 grams of an organic peroxide as identified in the following table. The mixture was cured by heating between platens at a temperature of 155° C. for a period of 15 minutes to form flat sheets 1/16-inch thick. Table VII identifies the experiments and the organic peroxide employed and gives the properties determined for the product.

*Table VII*

| Run No. | Catalysts | | Product |
|---|---|---|---|
| | Organic Peroxide Kind | Stannous Octoate, gms. | Light Transmission, Percent |
| 1 | Dicumyl Peroxide | 0 | 43.8 |
| 2 | ____do____ | 4 | 86.7 |
| 3 | Di-tert.-butyl Peroxide | 0 | 44.6 |
| 4 | ____do____ | 4 | 90.4 |
| 5 | 2,5-dimethyl-2,5-di-tert.-butyl-peroxy hexane | 0 | 45.1 |
| 6 | ____do____ | 4 | 82.1 |
| 7 | 2,5-dimethyl-2,5-di-tert.-butyl peroxy hexyne | 0 | 45.9 |
| 8 | ____do____ | 4 | 88.1 |
| 9 | 2,2-bis(tert.-butyl peroxy) butane | 0 | 45.2 |
| 10 | ____do____ | 4 | 76.3 |
| 11 | 1,4-bis(tert.-butylperoxy-methyl)-durene | 0 | No cure |
| 12 | ____do____ | 4 | 77.9 |
| 13 | Bis(p-methyl)cumyl peroxide | 0 | No cure |
| 14 | ____do____ | 4 | 89.0 |

EXAMPLE 8

In each of a series of experiments, a charge of 50 grams of a finely divided plastisol grade of polyvinyl chloride was mixed with 50 grams of a mixture of approximately 67 percent by weight of meta-vinyltoluene and 33 percent of para-vinyltoluene, and 0.5 gram of dicumyl peroxide, and 4 grams of a stannous salt of an organic acid as identified in the following table. The mixture was cured in a mold between platens to form flat sheets 1/8-inch thick by heating the same at a temperature of 150° C. for 20 minutes. Table VIII identifies the experiments, names the stannous salt employed and gives the flexural strength and percent light transmission determined for the product.

*Table VIII*

| Run No. | Synergist Catalyst | Product | |
|---|---|---|---|
| | Stannous Salt | Flexural Strength, lbs./sq. in. | Light Transmission, Percent |
| 1 | None | 6,000 | 29.5 |
| 2 | Stannous Octoate | 15,900 | 76.6 |
| 3 | Stannous Caproate | 14,700 | 70.8 |
| 4 | Stannous Laurate | 13,200 | 61.6 |
| 5 | Stannous Naphthenate | 9,500 | 39.5 |
| 6 | Stannous Oleate | 13,600 | 48.6 |

EXAMPLE 9

In each of a series of experiments, a charge of 60 grams of finely divided polyvinyl chloride of a plastisol grade was blended with 35 grams of a vinyltoluene fraction consisting of about 65 percent by weight of meta-vinyltoluene and about 35 percent of para-vinyltoluene and 5 grams of an ethylenically unsaturated ester copolymerizable with the vinyltoluene, and identified in the following table. To the mixture there was added 1 gram of dibutyl tin dilaurate, 0.4 gram of dicumyl peroxide and 2 grams of stannous octoate. A portion of the resulting mixture was poured into a 4" x 4" mold to form a layer 1/8-inch deep. The layer was heated between platens at a temperature of 150° C. for a period of 20 minutes, to cure the product by polymerizing the monomers, then was cooled and the product removed from the mold. Test pieces of 1/8 x 1/2 inch cross section were cut from the molded product and were used to determine properties for the product employing procedures similar to those employed in Example 1. Table IX identifies the experiments and names the unsaturated ester used in making the composition. The table also gives the properties determined for the product. For purpose of comparison similar compositions were prepared without the use of the stannous octoate, and were molded, cured and tested in similar manner and the results reported in the table.

*Table IX*

| Run No. | Starting Materials | | Product | | | | |
|---|---|---|---|---|---|---|---|
| | Kind | 5% | Stannous Octoate, gm. | Flexural Strength, lbs./sq. in. | Impact Strength, in-lbs. | Heat Distortion, Temp., °C. | Light Transmission, Percent |
| 1 | Diethyl Fumarate | | 2 | 15,100 | 2.4 | 73 | 70.5 |
| 2 | ____do____ | | 0 | 8,800 | 1.3 | 71 | 42.0 |
| 3 | Dibutyl Fumarate | | 2 | 14,700 | 2.1 | 74 | 70.8 |
| 4 | ____do____ | | 0 | 9,800 | 1.1 | 68 | 38.2 |
| 5 | Di(2-ethylhexyl)fumarate | | 2 | 13,400 | 2.3 | 71 | 85.4 |
| 6 | ____do____ | | 0 | 9,100 | 1.1 | 71 | 42.7 |
| 7 | Butyl methacrylate | | 2 | 15,200 | 4.1 | 74 | 82.2 |
| 8 | ____do____ | | 0 | 9,100 | 1.5 | 77 | 41.3 |
| 9 | 2-ethylhexyl methacrylate | | 2 | 14,800 | 3.6 | 74 | 82.0 |
| 10 | ____do____ | | 0 | 8,900 | 1.6 | 75 | 36.8 |
| 11 | Lauryl methacrylate | | 2 | 13,300 | 2.7 | 75 | 84.4 |
| 12 | ____do____ | | 0 | 10,900 | 1.3 | 74 | 41.5 |
| 13 | Cyclohexyl acrylate | | 2 | 15,600 | 2.7 | 74 | 83.1 |
| 14 | ____do____ | | 0 | 9,000 | 1.0 | 72 | 33.2 |

EXAMPLE 10

In each of a series of experiments, a finely divided plastisol grade of polyvinyl chloride was mixed with vinyl toluene, dicumyl peroxide, stannous octoate and dibutyl tin dilaurate in the proportions as stated in the following table. The vinyl toluene was similar to that employed in Example 1. The dispersion was prepared, was cured, and the cured product tested employing procedures similar to those employed in Example 1. The Table X identifies the experiments and gives the properties determined for the product.

*Table X*

| Run No. | Starting Materials | | | | Polymerizing Conditions | | Product | | | |
|---|---|---|---|---|---|---|---|---|---|---|
| | PVC, gm. | VT, gm. | Dicumyl Peroxide, gm. | Stannous Octoate, gm. | Temp., °C. | Time, Min. | Flexural Strength, lbs./sq. in. | Flexural Modulus, p.s.i.×10⁻⁵ | Barcol Hardness | Heat Dist. Temperature, °C. |
| 1 | 30 | 70 | 0.7 | 4.0 | 150 | 20 | 19,600 | 3.47 | 66 | 66 |
| 2 | 30 | 70 | 0.7 | 0.0 | 150 | 20 | 4,200 | 3.92 | 66 | 71 |
| 3 | 40 | 60 | 0.6 | 4.0 | 150 | 20 | 15,100 | 3.71 | 67 | 71 |
| 4 | 40 | 60 | 0.6 | 0.0 | 150 | 20 | 5,400 | 3.68 | 65 | 66 |
| 5 | 50 | 50 | 0.5 | 4.0 | 150 | 20 | 15,600 | 4.00 | 67 | 68 |
| 6 | 50 | 50 | 0.5 | 0.0 | 150 | 20 | 6,100 | 3.63 | 66 | 68 |
| 7 | 60 | 40 | 0.4 | 4.0 | 150 | 20 | 15,700 | 3.98 | 67 | 71 |
| 8 | 60 | 40 | 0.4 | 0.0 | 150 | 20 | 9,300 | 3.86 | 65 | 71 |
| 9 | 70 | 30 | 0.3 | 4.0 | 150 | 20 | 14,500 | 3.94 | 66 | 71 |
| 10 | 70 | 30 | 0.3 | 0.0 | 150 | 20 | 13,700 | 4.07 | 68 | 73 |

EXAMPLE 11

A composition was prepared by blending 60 parts by weight of finely divided polyvinyl chloride with 40 parts by weight of a vinyltoluene fraction as employed in Example 8, and 1 part of dibutyl tin dilaurate, 0.4 part of dicumyl peroxide and 4 parts of stannous octoate. In each of a series of experiments, a portion of the composition was placed in a 4″ x 4″ mold to form a layer ⅛ inch deep. The layer was pressed between platens and heated under time and temperature conditions as stated in the following table to polymerize the monomer, then was cooled and the product removed from the mold. Test pieces were cut from the molded product and were tested employing procedures similar to those employed in Example 1. Table XI identifies the experiments and gives the properties determined for the product.

*Table XI*

| Run No. | Polymerizing Conditions | | Product | | | | |
|---|---|---|---|---|---|---|---|
| | Temperature, °C. | Time, Min. | Flexural Strength, lbs./sq. in. | Flexural Modulus×10⁵, lbs./sq. in. | Impact Strength, in.-lbs. | Heat Distortion Temperature, °C. | Transparency, Percent |
| 1 | 120 | 60 | 11,200 | 4.27 | --- | 81 | 48.1 |
| 2 | 130 | 60 | 15,300 | 4.33 | --- | 83 | 54.8 |
| 3 | 150 | 20 | 16,700 | 4.69 | 1.8 | 79 | 83.1 |
| 4 | 170 | 8 | 15,000 | 4.49 | 1.8 | 74 | 86.6 |

EXAMPLE 12

In each of a series of experiments, a charge of 60 parts by weight of a finely divided plastisol grade of polyvinyl chloride was blended with a vinyltoluene fraction consisting of approximately 65 percent by weight of meta-vinyltoluene and 35 percent of para-vinyltoluene, together with 0.4 part of dicumyl peroxide, 2 parts of stannous octoate, 1 part of dibutyl tin dilaurate, and cyclohexyl acrylate in amounts as stated in the following table. The compositions were molded and cured and tested employing procedures as hereinbefore described. Table XIII identifies the experiments and gives the proportions of starting materials employed in preparing the same. The table also gives the properties determined for the product.

*Table XII*

| Run No. | Starting Materials | | | | Product | | | |
|---|---|---|---|---|---|---|---|---|
| | Polyvinyl Chloride, gms. | Vinyl Toluenes, gms. | Cyclohexyl Acrylate, gm. | Stannous Octoate, gm. | Flexural Strength, lbs./sq. in. | Impact Strength, in.-lbs. | Heat Distortion Temp., °C. | Light Transmission, Percent |
| 1 | 60 | 35 | 5 | 0 | 9,000 | 1.0 | 72 | 33.2 |
| 2 | 60 | 35 | 5 | 2 | 15,600 | 2.7 | 74 | 83.1 |
| 3 | 60 | 30 | 10 | 0 | 10,300 | 1.1 | 73 | 47.5 |
| 4 | 60 | 30 | 10 | 2 | 15,600 | 3.0 | 76 | 84.6 |
| 5 | 60 | 25 | 15 | 0 | 9,500 | 1.2 | 74 | 66.1 |
| 6 | 60 | 25 | 15 | 2 | 14,000 | 2.3 | 72 | 88.2 |
| 7 | 60 | 20 | 20 | 0 | 11,200 | 1.4 | 73 | 82.6 |
| 8 | 60 | 20 | 20 | 2 | 12,600 | 2.2 | 73 | 88.3 |

EXAMPLE 13

A charge of 50 grams of a finely divided plastisol grade of polyvinyl chloride was mixed with 50 grams of ortho-chlorostyrene, 1 gram of dibutyl tin dilaurate 0.25 gram of dicumyl peroxide and 4 grams of stannous octoate employing procedure similar to that employed in Example 1. The material was cured or polymerized by heating the same in a mold between platens heated at 140° C. for a period of 6 minutes. The molded product was tested for flexural strength and percent light transmission employing procedure similar to those employed in Example 1. The molded product had a flexural strength of 13,200 pounds per square inch and a light transmission value of 33.4 percent.

In contrast, a product prepared in similar manner, but without the stannous octoate, had a flexural strength of only 9100 pounds per square inch and only 19.7 percent light transmission.

EXAMPLE 14

A charge of 50 grams of a finely divided copolymer of about 90 percent by weight of vinyl chloride and 10 percent of vinyl acetate was blended with 50 grams of a vinyltoluene fraction consisting of about 65 percent by weight of meta-vinyltoluene and about 35 percent of para-vinyltoluene. To the mixture there was added 1 gram of dibutyl tin dilaurate, 0.5 gram of dicumyl peroxide and 2 grams of stannous octoate. A portion of the resulting mixture was poured into a 4" x 4" mold to form a layer ⅛ inch thick. The layer was heated between platens at a temperature of 150° C. for a period of 20 minutes to cure the product by polymerization of the monomers, then was cooled and the product removed. The product had the properties reported under A below. For purpose of comparison, a similar composition was prepared, except that no stannous octoate was added, which composition was cured and tested in the same manner. The properties of this composition are reported under B below.

| | A | B |
|---|---|---|
| Stannous octoate, percent | 2 | 0 |
| Flexural Strength, lbs./sq. in | 13,600 | 8,900 |
| Flexural Modulus (×10⁵), lbs./sq. in | 3.92 | 3.84 |
| Light Transmission, percent | 73.0 | 29.5 |

EXAMPLE 15

A charge of 50 grams of finely divided non-plastisol-forming suspension grade polyvinyl chloride was blended with 50 grams of vinyltoluene and 1 gram of dibutyl tin dilaurate, 0.5 gram of dicumyl peroxide and 2 grams of stannous octoate. A portion of the mixture was cured and tested employing procedures similar to those employed in Example 13. For purpose of comparison, a similar composition was prepared without stannous octoate and was tested. The compositions had the properties reported under B below.

| | A | B |
|---|---|---|
| Stannous Octoate, percent | 2 | 0 |
| Flexural Strength, lbs./sq. in | 10,700 | 6,500 |
| Flexural Modulus ×10⁵, lbs./sq. in | 3.21 | 3.07 |
| Light Transmission, percent | 68.3 | 44.6 |

I claim:

1. In a method of curing a composition comprising an intimate mixture of from 30 to 70 percent by weight of a vinyl chloride polymer containing at least 85 percent by weight of chemically combined vinyl chloride in the polymer molecules and from 70 to 30 percent by weight of a polymerizable liquid consisting of at least a predominant amount of at least one monovinyl aromatic compound having the general formula:

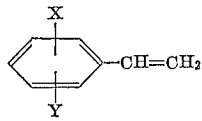

wherein X and Y are independently selected from the group consisting of hydrogen, halogen and alkyl radicals containing from 1 to 4 carbon atoms, and not more than a minor proportion of another ethylenically unsaturated liquid vinylidene compound copolymerizable with said monovinyl aromatic compound, the improvement which consists in carrying out the polymerization of the polymerizable liquid in said composition by heating the mixture at elevated temperatures sufficient to substantially solvate the vinyl chloride polymer with the polymerizable liquid in admixture with from about 1 to 10 percent by weight of a stannous salt selected from the group consisting of a stannous naphthenate and stannous salts of aliphatic monocarboxylic acids containing from 6 to 18 carbon atoms in the molecule, based on the weight of said polymerizable liquid, and a small but effectively synergist proportion of at least one organic peroxide selected from the group consisting of (a) organic peroxides having the general formula

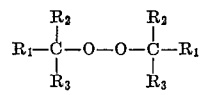

wherein $R_1$, $R_2$ and $R_3$ are independently selected from the group consisting of hydrogen, alkyl and aryl radicals, (b) organic peroxides having the general formula

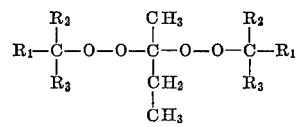

wherein $R_1$, $R_2$ and $R_3$ have the meaning given above, and (c) organic peroxides having the general formula

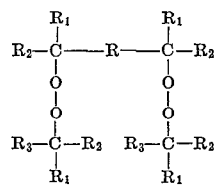

wherein R is a divalent hydrogen radical of the formula —$CH_2 \cdot CH_2$—, —CH=CH—, —CH≡C—, and

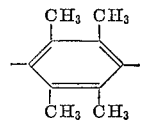

and $R_1$, $R_2$ and $R_3$ have the meaning given above.

2. A method which comprises polymerizing the polymerizable portion of a composition comprising from 30 to 70 percent by weight of a finely divided vinly chloride polymer containing at least 85 percent by weight of vinyl chloride chemically combined in the polymer molecules, in intimate admixture with from 70 to 30 percent by weight of at least one polymerizable liquid consisting of at least a predominant amount by weight of at least one monovinyl aromatic compound having the general formula:

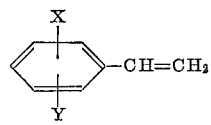

wherein X and Y are independently selected from the group consisting of hydrogen, halogen and alkyl radicals containing from 1 to 4 carbon atoms, and not more than a minor percent by weight of another ethylenically unsaturated organic compound copolymerizable with the monovinyl aromatic compound, by heating the dispersion at temperatures between about 120° and 180° C. while in intimate admixture with from about 1 to 10 percent by weight of a stannous salt selected from the group consisting of stannous naphthenate and stannous salts of aliphatic monocarboxylic acids containing from 6 to 18 carbon atoms, and from 0.1 to 2 percent by weight of at least one organic peroxide selected from the group consisting of (a) organic peroxides having the general formula

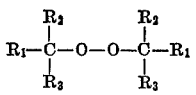

wherein $R_1$, $R_2$ and $R_3$ are independently selected from the group consisting of hydrogen, alkyl and aryl radicals, (b) organic peroxides having the general formula

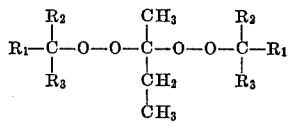

wherein $R_1$, $R_2$ and $R_3$ have the meaning given above, and (c) organic peroxides having the general formula

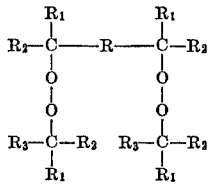

wherein R is a divalent hydrocarbon radical of the formula $-CH_2\cdot CH_2-$, $-CH=CH-$, $-C\equiv C-$ and

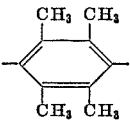

and $R_1$, $R_2$ and $R_3$ have the meaning given above.

3. A method as claimed in Claim 2 wherein the vinyl chloride polymer is polyvinyl chloride.

4. A method as claimed in claim 2 wherein the vinyl aromatic compound is vinyltoluene.

5. A method as claimed in claim 2 wherein the stannous salt is stannous octoate.

6. A method as claimed in claim 2 wherein the organic peroxide is dicumyl peroxide.

7. A method as claimed in claim 2 wherein the vinyl chloride polymer is polyvinyl chloride, the monovinyl aromatic compound is at least one isomeric vinyltoluene, the organic peroxide is dicumyl peroxide and the stannous salt is stannous octoate.

8. A method as claimed in claim 2, wherein the organic peroxide is di-tert.-butyl peroxide.

9. A method as claimed in claim 2 wherein the organic peroxide is 2,5-dimethyl-2,5-di-tert.-butylperoxy hexane.

10. A method as claimed in claim 2 wherein the organic peroxide is 2,5-dimethyl-2,5-di-tert.-butylperoxy hexyne.

11. A method as claimed in claim 2 wherein the organic peroxide is 2,2-bis(tert.-butyl peroxy)butane.

12. A method as claimed in claim 2 wherein the organic peroxide is 1,4-bis(tert.-butyl peroxy methyl)durene.

13. A method as claimed in claim 2 wherein the polymerizable liquid is a mixture of a predominant amount of vinyltoluene and a minor amount of 2-ethylhexyl acrylate.

14. A method as claimed in claim 2 wherein the polymerizable liquid is a mixture of a predominant amount of vinyltoluene and a minor amount of butyl methacrylate.

15. A method as claimed in claim 2 wherein the polymerizable liquid is a mixture of a predominant amount of vinyltoluene and a minor amount of diethyl fumarate.

16. A method as claimed in claim 2 wherein the polymerizable liquid is a mixture of a predominant amount of vinyltoluene and a minor amount of cyclohexyl acrylate.

References Cited by the Examiner

UNITED STATES PATENTS

| | | | |
|---|---|---|---|
| 2,467,527 | 4/1949 | Harris | 260—863 |
| 2,629,700 | 2/1953 | Caldwell et al. | 260—45.75 |
| 3,061,531 | 10/1962 | Smith | 260—884 |
| 3,157,713 | 11/1964 | Leese | 260—884 |

FOREIGN PATENTS

| | | |
|---|---|---|
| 559,081 | 7/1957 | Belgium. |
| 817,684 | 8/1959 | Great Britain. |

MURRAY TILLMAN, *Primary Examiner.*

J. T. GOOLKASIAN, *Assistant Examiner.*